(12) United States Patent
Lee et al.

(10) Patent No.: US 11,652,249 B2
(45) Date of Patent: May 16, 2023

(54) BATTERY MODULE FOR VEHICLE

(71) Applicants: Hyundai Motor Company, Seoul (KR); Kia Motors Corporation, Seoul (KR)

(72) Inventors: Yong Jin Lee, Gyeonggi-do (KR); Jae Hoon Choi, Gyeonggi-do (KR); Tae Hyuck Kim, Chungcheongnam-do (KR); Yong Hwan Choi, Gyeonggi-do (KR); Yong Jae Kim, Gyeonggi-do (KR); Hae Kyu Lim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 745 days.

(21) Appl. No.: 16/160,602

(22) Filed: Oct. 15, 2018

(65) Prior Publication Data
US 2020/0006825 A1 Jan. 2, 2020

(30) Foreign Application Priority Data
Jun. 28, 2018 (KR) ........................ 10-2018-0074476

(51) Int. Cl.
*H01M 10/6556* (2014.01)
*H01M 10/613* (2014.01)
(Continued)

(52) U.S. Cl.
CPC ..... *H01M 10/6556* (2015.04); *H01M 10/613* (2015.04); *H01M 10/625* (2015.04); *H01M 10/647* (2015.04); *H01M 10/6551* (2015.04); *H01M 50/211* (2021.01); *H01M 50/271* (2021.01); *H01M 2220/20* (2013.01)

(58) Field of Classification Search
CPC ........... H01M 10/6556; H01M 10/613; H01M 10/625
See application file for complete search history.

(56) References Cited

U.S. PATENT DOCUMENTS

| 2015/0214586 A1* | 7/2015 | Yeow ................. H01M 10/647 429/120 |
| 2019/0123405 A1* | 4/2019 | Jeon ................. H01M 10/6554 |

FOREIGN PATENT DOCUMENTS

| EP | 2885827 B1 * | 8/2017 | ............ H01M 50/40 |
| KR | 2015-0002982 A | 1/2015 | |

(Continued)

OTHER PUBLICATIONS

Lee et al., KR 20160016498 A, English Machine Translation (Year: 2016).*

(Continued)

*Primary Examiner* — Tae-Sik Kang
(74) *Attorney, Agent, or Firm* — Fox Rothschild LLP

(57) ABSTRACT

A battery module for a vehicle includes a cell module in which battery cells are overlapped with each other while having a predetermined directivity, and a cooling channel module directly bonded to at least one surface parallel to an overlap direction of the battery cells of the cell module, the cooling channel module having a refrigerant circulated therein, where a cell bonding surface of the cooling channel module has a wave-shaped cross section curved along a curvature formed by end portions of the overlapped battery cells.

6 Claims, 4 Drawing Sheets

(51) Int. Cl.
*H01M 10/647* (2014.01)
*H01M 10/6551* (2014.01)
*H01M 10/625* (2014.01)
*H01M 50/271* (2021.01)
*H01M 50/211* (2021.01)

(56) References Cited

FOREIGN PATENT DOCUMENTS

| KR | 2016-0105360 A | 9/2016 | | |
|---|---|---|---|---|
| KR | 101773105 B1 | * | 8/2017 | ............ H01M 50/24 |
| KR | 10-2019-0054300 A | 5/2019 | | |

OTHER PUBLICATIONS

Gerundt et al., EP2885827 A1, English Machine Translation (Year: 2015).*

* cited by examiner

BATTERY MODULE FOR VEHICLE

CROSS REFERENCE TO RELATED APPLICATION

The present application claims under 35 U.S.C. § 119(a) the benefit of Korean Patent Application No. 10-2018-0074476, filed Jun. 28, 2018, the entire contents of which are incorporated by reference herein.

BACKGROUND

(a) Technical Field

The present disclosure relates to a battery module for a vehicle, more particularly, to an arrangement for cooling the battery module used in a hybrid vehicle or an electric vehicle.

(b) Description of the Related Art

A battery module for storing electric energy required for driving a vehicle is essential for a hybrid vehicle or an electric vehicle, and the battery module should have a high energy density so as to maintain a charging performance of the vehicle.

In a case in which the energy density of the battery module is high as described above, in order to ensure stable operation, it is necessary to ensure an excellent cooling performance for effectively cooling heat generated in the battery module.

The contents described as the related art have been provided only to assist in understanding the background of the present disclosure and should not be considered as corresponding to the related art known to those having ordinary skill in the art.

SUMMARY

An object of the present disclosure is to provide a battery module for a vehicle capable of minimizing a size of the battery module with a simple layout and small number of parts while ensuring excellent cooling performance by minimizing a heat transfer path of heat generated in battery cells constituting the battery module and maximizing a heat transfer area.

According to an embodiment of the present disclosure, a battery module for a vehicle includes a cell module in which battery cells are overlapped with each other while having a predetermined directivity; and a cooling channel module directly bonded to at least one surface parallel to an overlap direction of the battery cells of the cell module and having a refrigerant circulated therein, wherein a cell bonding surface of the cooling channel module has a wave-shaped cross section curved along a curvature formed by end portions of the overlapped battery cells.

The cell module and the cooling channel module may be bonded to each other by a heat radiating adhesive in a state in which the cell module and the cooling channel module are disposed so that a shortest distance from the battery cells of the cell module to the refrigerant in the cooling channel module is maintained uniformly.

A cover plate formed of a single plate of a wave-shaped cross section curved along the curvature formed by the end portions of the overlapped battery cells may be bonded to at least another surface to which the cooling channel module is not bonded, among surfaces parallel to the overlap direction of the battery cells of the cell module.

The cell module and the cover plate may be bonded to each other by the heat radiating adhesive in a state in which the cell module and the cover plate are disposed so that a shortest distance from the battery cells of the cell module to the atmosphere outside the cover plate is maintained uniformly.

The cell module may be overlapped in a horizontal direction; the cooling channel module may be bonded to a lower side of the cell module; the cover plate may be bonded to an upper side of the cell module; side covers may be each provided on both ends of the cell module in the overlap direction; and the side covers may be coupled to the cover plate and the cooling channel module in a vertical direction to surround and protect the cell module and to provide structural rigidity.

An end portion of the cooling channel module may be integrally provided with an inlet port and an outlet port for circulating the refrigerant in the cooling channel module.

DETAILED DESCRIPTION OF THE EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Figure 1:
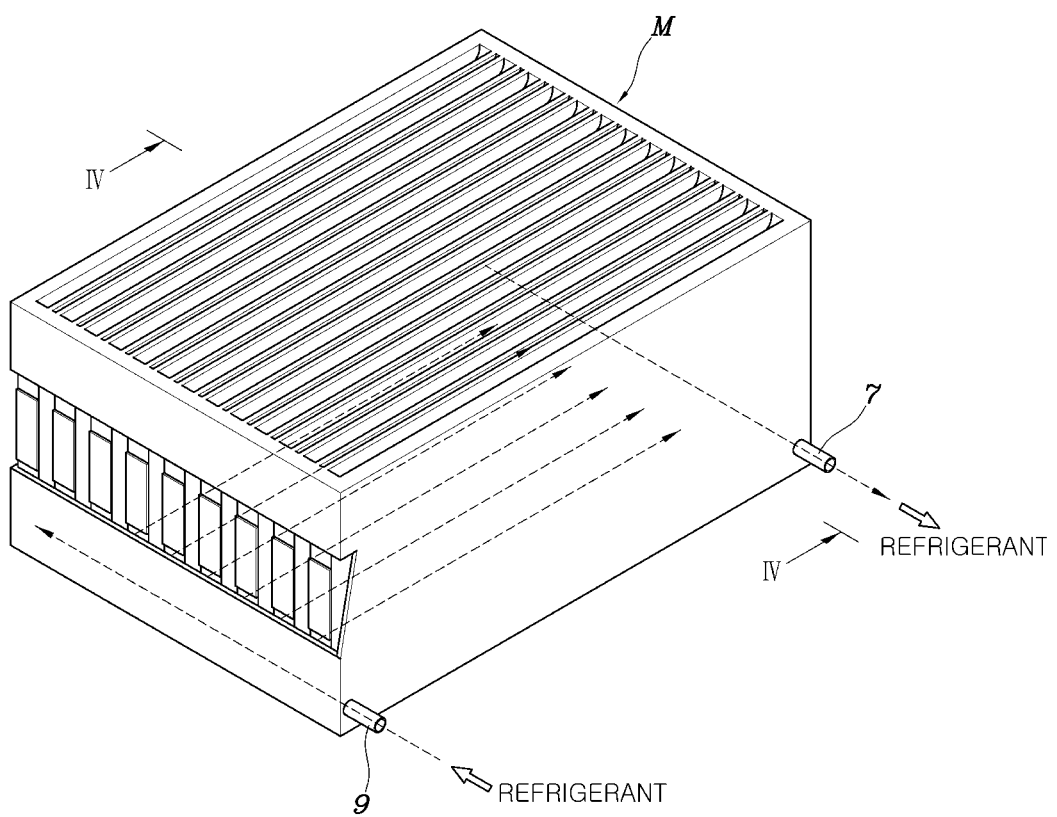
FIG. 1 is a perspective view of a battery module for a vehicle according to an embodiment of the present disclosure.
Figure 2:
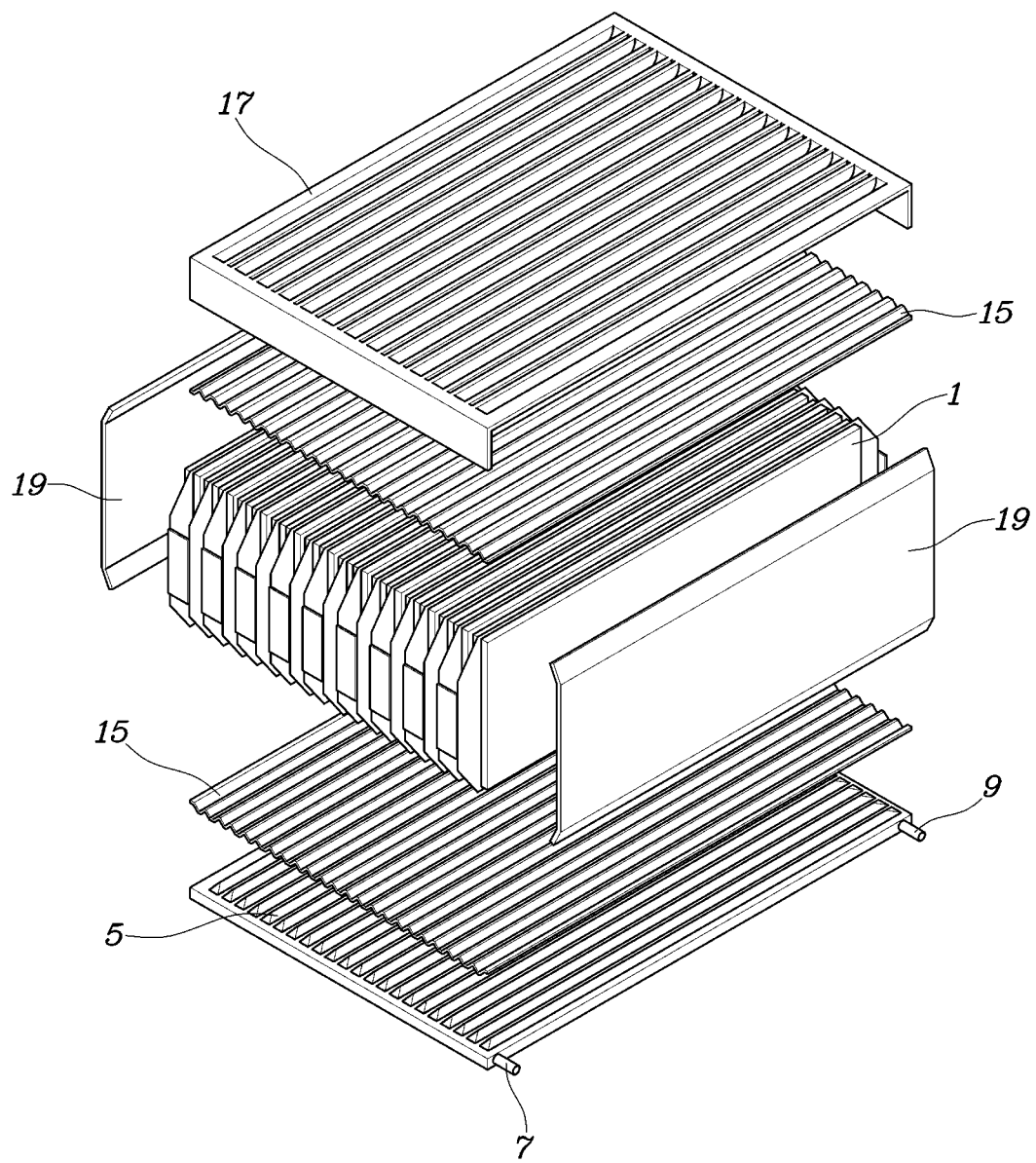
FIG. 2 is an exploded perspective view of the battery module of FIG. 1.
Figure 3:
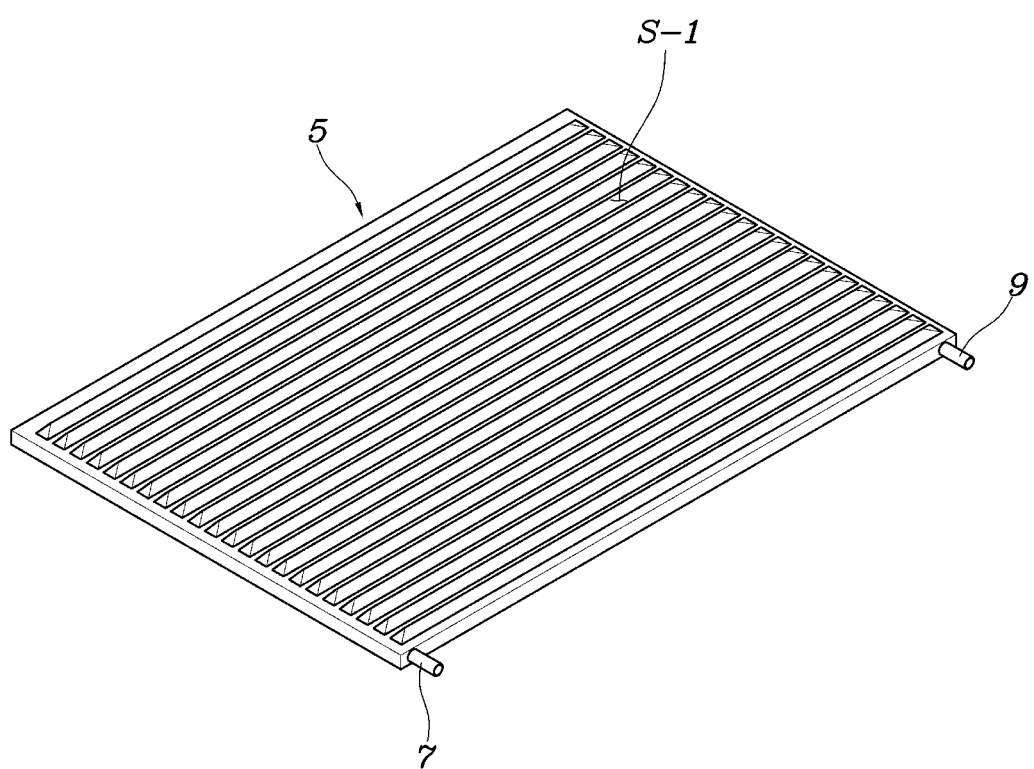
FIG. 3 is a perspective view of a cooling channel module of FIG. 2.
Figure 4:
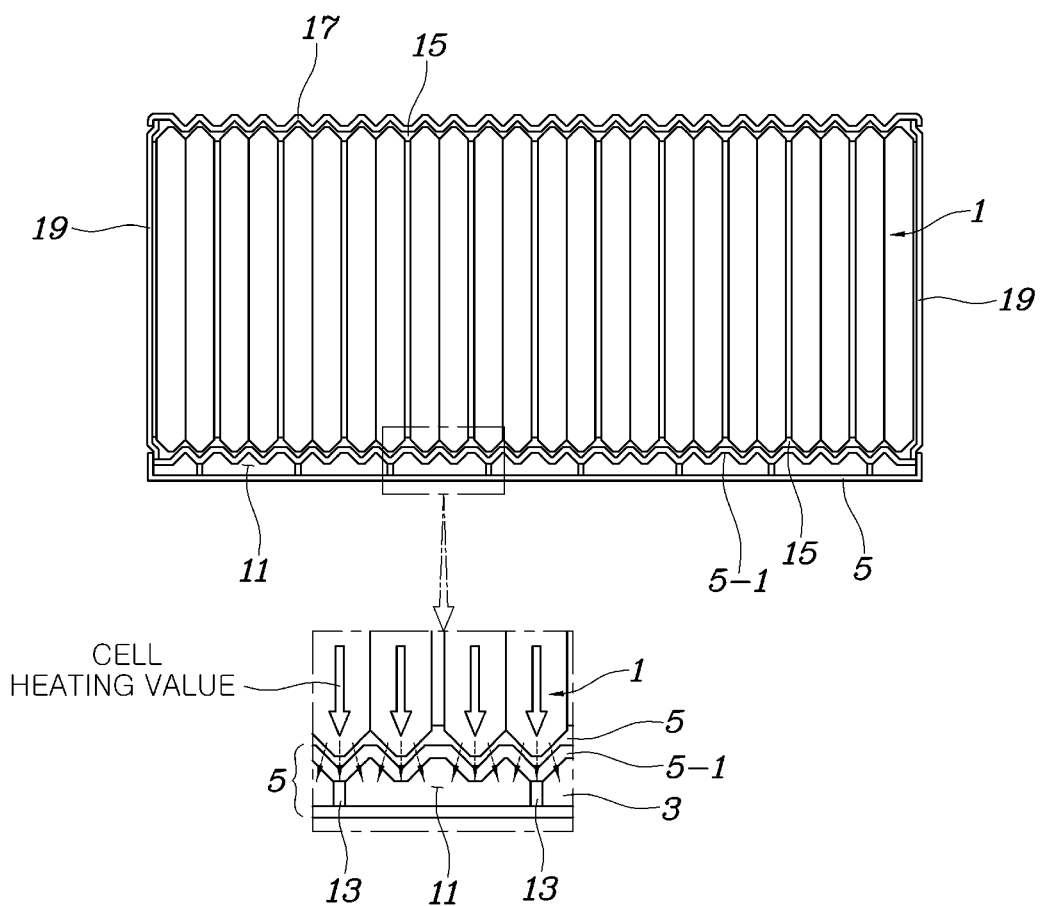
FIG. 4 is a cross-sectional view taken along the line IV-IV of FIG. 1.

Referring to FIGS. 1 to 4, a battery module M for a vehicle according to an embodiment of the present disclosure includes a cell module 1 in which battery cells are overlapped with each other while having a predetermined directivity; and a cooling channel module 5 directly bonded to at least one surface (i.e., one or more surfaces) parallel to an overlap direction of the battery cells of the cell module 1 and having a refrigerant 3 circulated therein, wherein a cell bonding surface 5-1 of the cooling channel module 5 has a wave-shaped cross section curved along a curvature formed by end portions of the overlapped battery cells.

That is, the battery cells are overlapped with each other while having a predetermined directivity in a horizontal direction on the drawing to thereby configure the cell module 1, and the cooling channel module 5 is bonded to a lower side of the cell module 1 so as to be parallel to the overlap direction of the battery cells to thereby directly cool a heat generated in the battery cells by the refrigerant 3 of the cooling channel module 5.

An end portion of the cooling channel module 5 is integrally provided with an inlet port 7 and an outlet port 9 for circulating the refrigerant 3 in the cooling channel module. The refrigerant 3 is supplied to the inlet port 7 and is recovered through the outlet port 9 to cool the refrigerant 3, and is then supplied to the inlet port 7, thereby making it possible to smoothly facilitate a cooling action.

For reference, a cooling channel 11 is formed in the cooling channel module 5 so that the refrigerant 3 may circulate in the cooling channel module, and partitions 13 for ensuring rigidity are provided in the cooling channel module 5.

The cell bonding surface 5-1 of the cooling channel module 5 is formed to be curved in a similar shape along the curvature formed by overlapping the end portions of the battery cells as described above. As can be seen from the cross-sectional view of FIG. 4, the cell module 1 and the cooling channel module 5 are bonded to each other by a heat radiating adhesive 15 in a state in which the cell module 1 and the cooling channel module 5 are disposed so that the shortest distance from the battery cells of the cell module 1 to the refrigerant 3 in the cooling channel module 5 is maintained uniformly. As a result, heat transfer from the battery cells to the cooling channel module 5 is substantially uniform in all the battery cells, a heat transfer area is maximized, and the shortest overall heat transfer path by conduction is secured, thereby making it possible to maximize a cooling performance of the battery cells.

In particular, since the cooling channel module 5 is directly bonded to the end portions of the battery cells by the heat radiating adhesive 15 and no other element is interposed between the end portions of the battery cells and the cooling channel module 5, heat transfer from the battery cells to the refrigerant 3 may be directly and effectively performed.

The cooling channel module 5 as described above may also be additionally installed in the same manner on an upper side as well as the lower side of the cell module 1 in the embodiment so as to cope with a situation where a smoother cooling is required.

In addition, as in the present embodiment, a cover plate 17 formed of a single plate of a wave-shaped cross section curved along the curvature formed by the end portions of the overlapped battery cells may be bonded to the at least one surface to which the cooling channel module 5 is not bonded, among surfaces parallel to the overlap direction of the battery cells of the cell module 1.

That is, the cooling channel module 5 may also be additionally installed on the upper side of the cell module 1 to further improve the cooling performance, but according to the present embodiment, the cover plate 17 is mounted as described above.

The cell module 1 and the cover plate 17 are bonded by the heat radiating adhesive 15 in a state in which they are disposed so that the shortest distance from the battery cells of the cell module 1 to the atmosphere outside the cover plate 17 is maintained uniformly. As a result, heat generated from the battery cells of the cell module 1 is discharged to the atmosphere outside the cover plate 17 through the cover plate 17 installed on the upper side of the cell module 1 to thereby cool the battery cells.

Here, the cell module 1 and the cover plate 17 may be bonded to each other by the heat radiating adhesive 15 as described above, and a separate cell fixing pad is interposed between the cell module 1 and the cover plate 17, if necessary, thereby fixing positions of the battery cells with respect to the cover plate 17.

In the present embodiment, the cell module 1 is overlapped in a horizontal direction; the cooling channel module 5 is bonded to the lower side of the cell module 1; the cover plate 17 is bonded to the upper side of the cell module 1; side covers 19 are provided on both ends in the overlap direction of the cell module 1, such that the side covers 19 are coupled to the cover plate 17 and the cooling channel module 5 in a vertical direction, thereby surrounding and protecting the cell module 1 and providing structural rigidity.

Therefore, the battery module M for a vehicle according to the present disclosure surrounds and protects an outer portion of the cell module 1, autonomously secures the structural rigidity, and effectively and uniformly discharges and cool the heat generated in the battery cells to the outside, thereby making it possible to minimize an overall volume of the battery module and maximize the cooling performance thereof.

As described above, according to the embodiment of the present disclosure, an excellent cooling performance may be ensured by minimizing a heat transfer path of a heat generated in the battery cells constituting the battery module and maximizing the heat transfer area, while minimizing the size of the battery module by using a simple layout and small number of parts.

Although the present disclosure has been shown and described with respect to specific embodiments, it will be apparent to those having ordinary skill in the art that the present disclosure may be variously modified and altered without departing from the spirit and scope of the present disclosure as defined by the following claims.

What is claimed is:

1. A battery module for a vehicle, comprising:
a cell module in which battery cells are overlapped with each other while having a predetermined directivity; and
a cooling channel module directly bonded to at least one surface parallel to an overlap direction of the battery cells of the cell module, the cooling channel module having a refrigerant circulated therein,
wherein a cell bonding surface of the cooling channel module has a wave-shaped cross section curved along a curvature formed by end portions of the overlapped battery cells,
wherein a cooling channel is formed in the cooling channel module to allow the refrigerant to circulate in the cooling channel module,
wherein partitions for ensuring rigidity are provided in the cooling channel module;
wherein the cooling channel has internal walls facing each other, and
wherein the partitions extend between the internal walls of the cooling channel to support the internal walls of the cooling channel,
wherein the partitions support protruding portions of the wave-shaped cross section of the cell bonding surface of the cooling channel module.

2. The battery module of claim 1, wherein the cell module and the cooling channel module are bonded to each other by a heat radiating adhesive in a state in which the cell module and the cooling channel module are disposed so that a shortest distance from the battery cells of the cell module to the refrigerant in the cooling channel module is uniform.

3. The battery module of claim 1, wherein a cover plate formed of a single plate of a wave-shaped cross section curved along the curvature formed by the end portions of the overlapped battery cells is bonded to at least another surface to which the cooling channel module is not bonded, among surfaces parallel to the overlap direction of the battery cells of the cell module.

4. The battery module of claim 3, wherein the cell module and the cover plate are bonded to each other by the heat radiating adhesive in a state in which the cell module and the cover plate are disposed so that a shortest distance from the battery cells of the cell module to atmosphere outside the cover plate is maintained uniform.

5. The battery module of claim 3, wherein the cell module is overlapped in a horizontal direction;
the cooling channel module is bonded to a lower side of the cell module;
the cover plate is bonded to an upper side of the cell module;
side covers are each provided on both ends of the cell module in the overlap direction; and
the side covers are coupled to the cover plate and the cooling channel module in a vertical direction to surround and protect the cell module and to provide structural rigidity.

6. The battery module of claim 1, wherein an end portion of the cooling channel module is integrally provided with an inlet port and an outlet port for circulating the refrigerant in the cooling channel module.

* * * * *